(12) United States Patent
Ivanov et al.

(10) Patent No.: US 10,233,780 B2
(45) Date of Patent: Mar. 19, 2019

(54) FLANGE PARTIAL SECTION REPLACEMENT REPAIR

(71) Applicant: UNITED TECHNOLOGIES CORPORATION, Farmington, CT (US)

(72) Inventors: Oleg Ivanov, Suffield, CT (US); Derek W. Anderson, Cromwell, CT (US)

(73) Assignee: United Technologies Corporation, Farmington, CT (US)

( * ) Notice: Subject to any disclaimer, the term of this patent is extended or adjusted under 35 U.S.C. 154(b) by 438 days.

(21) Appl. No.: 14/903,400

(22) PCT Filed: Jun. 23, 2014

(86) PCT No.: PCT/US2014/043613
§ 371 (c)(1),
(2) Date: Jan. 7, 2016

(87) PCT Pub. No.: WO2015/047495
PCT Pub. Date: Apr. 2, 2015

(65) Prior Publication Data
US 2016/0153313 A1    Jun. 2, 2016

Related U.S. Application Data

(60) Provisional application No. 61/844,896, filed on Jul. 11, 2013.

(51) Int. Cl.
*F01D 25/24* (2006.01)
*B23K 26/21* (2014.01)
(Continued)

(52) U.S. Cl.
CPC ............ *F01D 25/243* (2013.01); *B23K 9/007* (2013.01); *B23K 9/167* (2013.01);
(Continued)

(58) Field of Classification Search
CPC ... F01D 25/24; F01D 25/243; B23K 15/0046; B23K 9/007; B23K 26/21;
(Continued)

(56) References Cited

U.S. PATENT DOCUMENTS

| | | |
|---|---|---|
| 4,234,275 A | 11/1980 | Clement |
| 4,580,931 A | 4/1986 | Wilger et al. |

(Continued)

OTHER PUBLICATIONS

Supplementary European Search Report for European Application No. 14848672.3 dated Feb. 22, 2017.
(Continued)

*Primary Examiner* — Igor Kershteyn
*Assistant Examiner* — Topaz L Elliott
(74) *Attorney, Agent, or Firm* — Carlson, Gaskey & Olds, P.C.

(57) ABSTRACT

A method of repairing a casing for a gas turbine engine, wherein the casing has a wall extending generally axially, and between at least one radially extending flange, the radially extending flange being formed with a plurality of bolt holes, includes the steps of removing a portion of the flange including at least one bolt hole. The removed portion is associated with a defect and a remaining portion of the flange includes at least one non-removed bolt hole. A replacement portion is obtained to replace the removed portion. The replacement portion is secured in an opening left in the flange by the removed portion. A repaired gas turbine engine casing is also disclosed.

18 Claims, 3 Drawing Sheets

(51) Int. Cl.
  *B23K 15/00* (2006.01)
  *B23P 6/00* (2006.01)
  *B23K 9/167* (2006.01)
  *B23K 9/007* (2006.01)
(52) U.S. Cl.
  CPC .......... *B23K 15/0046* (2013.01); *B23K 26/21* (2015.10); *B23P 6/005* (2013.01); *F05D 2220/32* (2013.01); *F05D 2230/10* (2013.01); *F05D 2230/232* (2013.01); *F05D 2230/52* (2013.01); *F05D 2230/80* (2013.01)
(58) Field of Classification Search
  CPC ........... F05D 2230/232; F05D 2230/10; F05D 2230/80; F05D 2230/52
  USPC .............................. 29/402.11, 402.13, 402.16
  See application file for complete search history.

(56) References Cited

U.S. PATENT DOCUMENTS

| | | |
|---|---|---|
| 4,625,465 A | 12/1986 | Kirt |
| 4,652,186 A | 3/1987 | Sverdlin |
| 4,820,089 A | 4/1989 | Shiets |
| 4,850,756 A | 7/1989 | Dubois |
| 5,025,556 A | 6/1991 | Safford |
| 6,892,931 B2 | 5/2005 | Steplewski |
| 7,244,320 B2 | 7/2007 | Malley et al. |
| 7,249,463 B2 | 7/2007 | Anderson et al. |
| 7,858,897 B2 | 12/2010 | Beranger |
| 8,881,394 B2 * | 11/2014 | Boletis .................... B23P 6/002 29/402.11 |
| 2007/0084906 A1 | 4/2007 | Vargas et al. |
| 2008/0216300 A1 | 9/2008 | Anderson et al. |
| 2010/0183431 A1 | 7/2010 | Anantharaman et al. |
| 2011/0293409 A1 | 12/2011 | Reghezza et al. |

OTHER PUBLICATIONS

International Preliminary Report on Patentability for International Application No. PCT/US2014/043613 dated Jan. 21, 2016.
International Search Report from corresponding PCT/US2014/043613.

* cited by examiner

FLANGE PARTIAL SECTION REPLACEMENT REPAIR

CROSS-REFERENCE TO RELATED APPLICATION

This application claims priority to U.S. Provisional Application No. 61/844,896, filed Jul. 11, 2013

BACKGROUND

This application relates to a method and apparatus for repairing a bolt hole strap flange on a gas turbine engine case.

Gas turbine engines are known and include a compressor compressing air and delivering it into a combustion section. The air is mixed with fuel and ignited and products of that combustion pass downstream over turbine rotors, driving them to rotate.

Casings typically surround and enclose the turbine section and the compressor section. The casing will typically have a case wall and a bolt hole strap or flange extending radially away from the wall. A plurality of bolt holes are formed within the flange.

It is known that the flange may develop cracks and, in particular, extending from the bolt holes. If the crack extends radially from the bolt hole and away from the wall, weld repair techniques may be utilized. Further, a wedge method has also been utilized.

However, the crack may also extend toward the case wall and this is less susceptible to weld repair.

It is known to remove the entire flange and replace it.

SUMMARY

In a featured embodiment, a method of repairing a casing for a gas turbine engine, wherein the casing has a wall extending generally axially, and between at least one radially extending flange, the radially extending flange being formed with a plurality of bolt holes, includes the steps of removing a portion of the flange including at least one bolt hole. The removed portion is associated with a defect and a remaining portion of the flange includes at least one non-removed bolt hole. A replacement portion is obtained to replace the removed portion. The replacement portion is secured in an opening left in the flange by the removed portion.

In another embodiment according to the previous embodiment, the removed portion also includes the removal of a portion of the wall.

In another embodiment according to any of the previous embodiments, the securement step is provided by welding the replacement portion into circumferential edges of the flange defining the removed portion.

In another embodiment according to any of the previous embodiments, the securement step also includes the step of welding the replacement portion into a remaining portion of the wall.

In another embodiment according to any of the previous embodiments, the securement step is provided by welding the replacement portion into circumferential edges of the flange defining the removed portion.

In another embodiment according to any of the previous embodiments, the defect is the removed portion including a crack extending from the at least one bolt hole, and radially toward the wall.

In another embodiment according to any of the previous embodiments, the defect relates to the at least one bolt hole.

In another embodiment according to any of the previous embodiments, the wall is at least one of cylindrical and conical.

In another embodiment according to any of the previous embodiments, the flange extends radially outwardly from the wall.

In another embodiment according to any of the previous embodiments, the flange includes a radially outer portion generally circumferentially aligned with the at least one bolt hole, and scallops on circumferential sides of the outer portion, with the removed portion being removed within circumferentially spaced scallop portions.

In another embodiment according to any of the previous embodiments, a pre-machine replacement portion is formed of a standard size, and the removed portion of the flange is removed to match the standard size of the pre-machined section.

In another embodiment according to any of the previous embodiments, a size of the replacement portion is machined to match the size of the removed portion.

In another featured embodiment, a repaired gas turbine engine casing has a wall extending generally axially, and at least one radially extending bolt flange at one axial end. There is a plurality of bolt holes in the radially extending bolt flange. A portion of the radially extending flange has a replacement bolt hole portion secured into an opening formed by the removal of a defective bolt hole flange.

In another embodiment according to the previous embodiment, the bolt flange extends radially outwardly from the wall.

In another embodiment according to any of the previous embodiments, the flange includes a radially outer portion generally circumferentially aligned with the at least one bolt hole, and scallops on circumferential sides of the outer portion, with the removed portion being removed within circumferentially spaced scallop portions.

In another embodiment according to any of the previous embodiments, the portion is of a standard size.

In another embodiment according to any of the previous embodiments, a size of the portion is machined to match a size of a portion which was removed from the defective bolt hole flange.

In another featured embodiment, a method of repairing a casing for a gas turbine engine has a wall extending generally axially, and between at least one radially outwardly extending flange. The radially outwardly extending flange is formed with a plurality of bolt holes. A portion of the flange and a portion of the wall including at least one bolt hole is removed. The removed portion is associated with a defect, and a remaining portion of the flange includes at least one non-removed bolt hole. A replacement portion is obtained to replace the removed portion. The replacement portion is welded into circumferential edges of the flange defining the removed portion, and also welding the replacement portion into a remaining portion of the wall.

In another embodiment according to the previous embodiment, a pre-machine replacement portion is formed of a standard size, and the removed portion of the flange is removed to match the standard size of the pre-machined section.

In another embodiment according to any of the previous embodiments, a size of the replacement portion is machined to match the size of the removed portion.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

These and other features may be best understood from the following drawings and specification.

DETAILED DESCRIPTION

Figure 1:
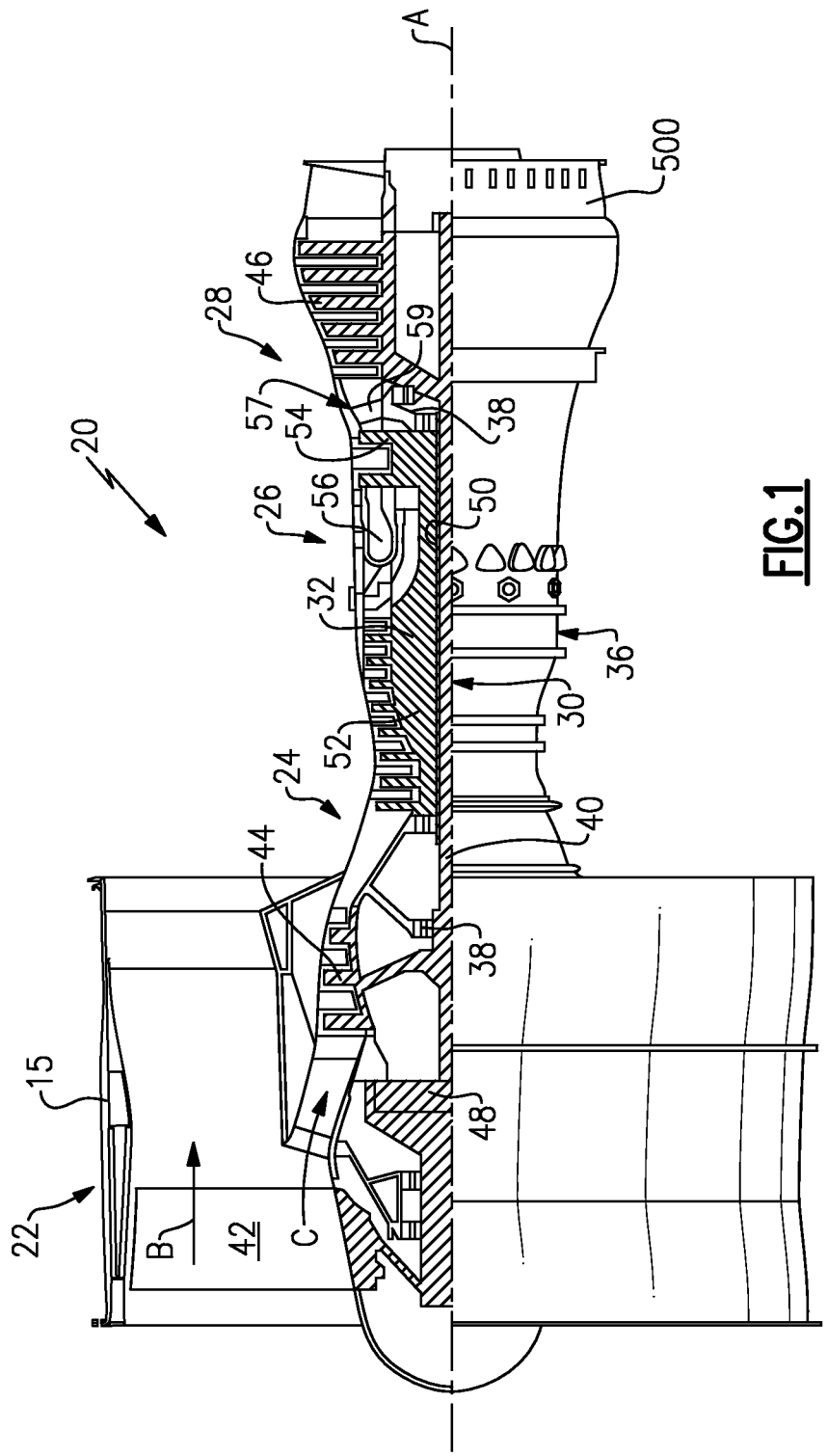
FIG. 1 is a schematic view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmenter section (not shown) among other systems or features. The fan section 22 drives air along a bypass flow path B in a bypass duct defined within a fan case 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48. A turbine exhaust case 500 also provides a mount for the engine.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10), the fan diameter is significantly larger than that of the low pressure compressor 44, and the low pressure turbine 46 has a pressure ratio that is greater than about five (5). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150 ft/second.

Figure 2A:
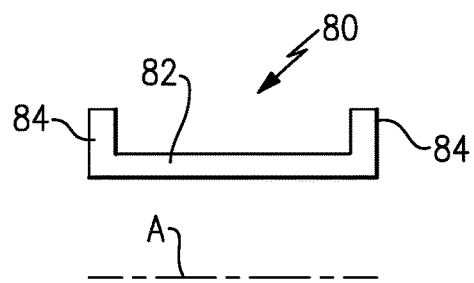
FIG. 2A shows a casing that may be incorporated into the FIG. 1 gas turbine engine.

FIG. 2A shows a casing 80 which may be utilized to enclose any number of parts of the gas turbine engine 20 of FIG. 1. The casing 80 is generally cylindrical and extends for 360 degrees about a center axis A (see also FIG. 1). As shown, a case wall 82 extends between radially outwardly extending flanges 84.

While the casing 80 is shown as cylindrical, it may also be conical, or any other shape. Generally, the casing extends axially about some central reference axis.

Figure 2B:
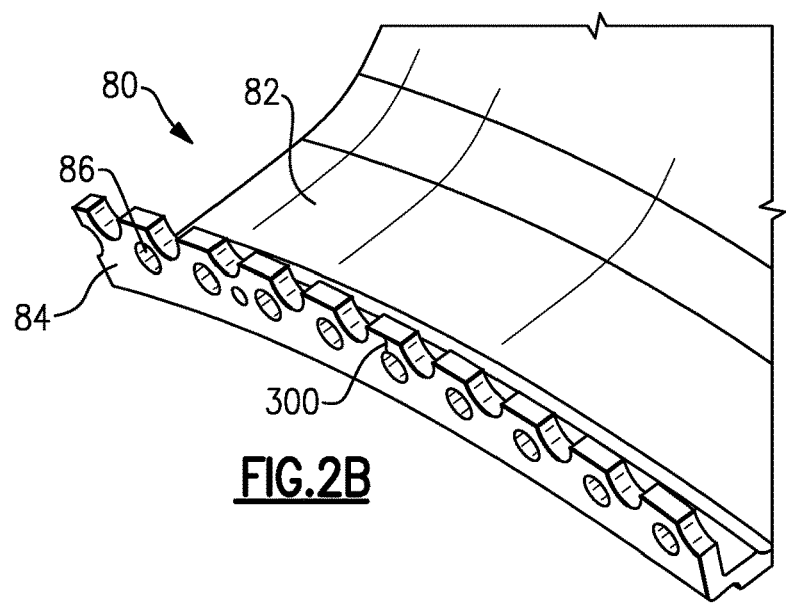
FIG. 2B shows a detail of the FIG. 2A casing.

FIG. 2B shows a detail of the flange 84 and, namely, a plurality of bolt holes 86. As can be appreciated, the flange 84 extends radially from the wall 82 and the bolt holes 86 are formed in the flange 84. A crack 300 extends radially outwardly from the bolt hole 86. Such a crack 300 may be repaired by welding techniques.

Further, while the flange 84 is shown extending radially outwardly, radially inwardly extending flanges are also known. Further, it should not be implied that the flanges extend at a right angle relative to the case wall 82, but rather, simply that it does extend with at least a component in a radially extending direction.

Figure 2C:
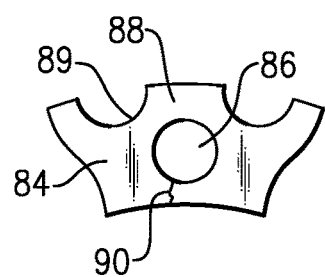
FIG. 2C shows a defect in the FIG. 2A casing.

As shown in FIG. 2C, a crack 90 is propagated from a bolt hole 86 toward the surface of the flange 84 which is connected to the wall 82. As mentioned above, it is somewhat unsatisfactory to repair such a crack with existing welding techniques. As can be seen in FIG. 2C, the flange 84 has an outer portion 88 generally circumferentially aligned with the bolt hole 86, and scalloped portions 89 which are intermediate adjacent bolt holes 86.

Figure 3D:
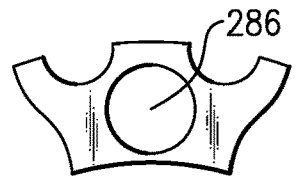
FIG. 3D shows an alternative to FIG. 2C.
Figure 3A:
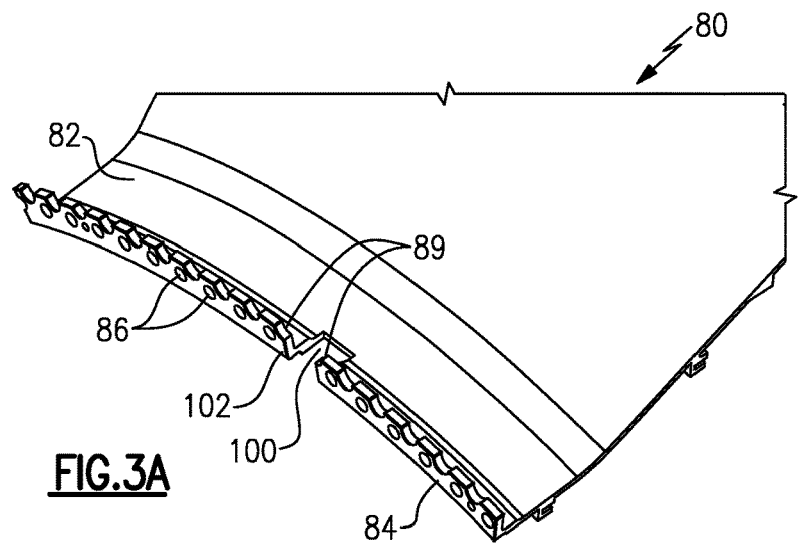
FIG. 3A shows a first repair step.

FIG. 3A shows a first step in repairing the casing 80. When the crack 90 is identified, the following repair process is initiated. A section 100 of the wall 82 and a section 102 of the flange is removed. This would be the section associated with the hole 86 with the crack 90. While a single bolt hole portion has been removed, a worker of ordinary skill in the art would recognize that more than one bolt hole could be removed. Notably, a plurality of other bolt holes 86 and their respective flange portions do remain. As can be seen, the removed portion may be intermediate to portions of two scallops 89 in the remainder of the flange 84. Of course, the scallops are optional, and the teachings of this application would extend to casings not having such scallops.

Figure 3B:
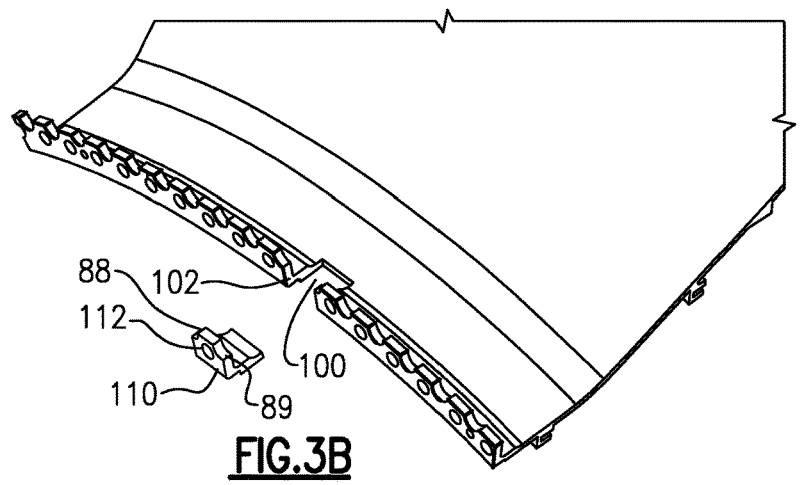
FIG. 3B shows a subsequent step.

FIG. 3B shows a subsequent step. Namely, a replacement part 110 is obtained and includes a hole 112. As can be seen, there may be scallop portions 89 on the replacement part 110. In one embodiment, the replacement part 110 may be fabricated from a pre-machined section or block of a material similar or identical to the material of the flange 84. In one aspect, the pre-machined section also includes a pre-machined bolt hole 86. In one aspect, the removed section 100 is sized to include the bolt and the crack as described above, while also being sized to match the pre-machined section. That is, the pre-machined section may be of a standard size. In this aspect, the pre-machined section may not require additional fabrication. In another aspect, the pre-machined section is machined onsite to match the dimensions of the removed section 100, removed from the flange 84.

Figure 3C:
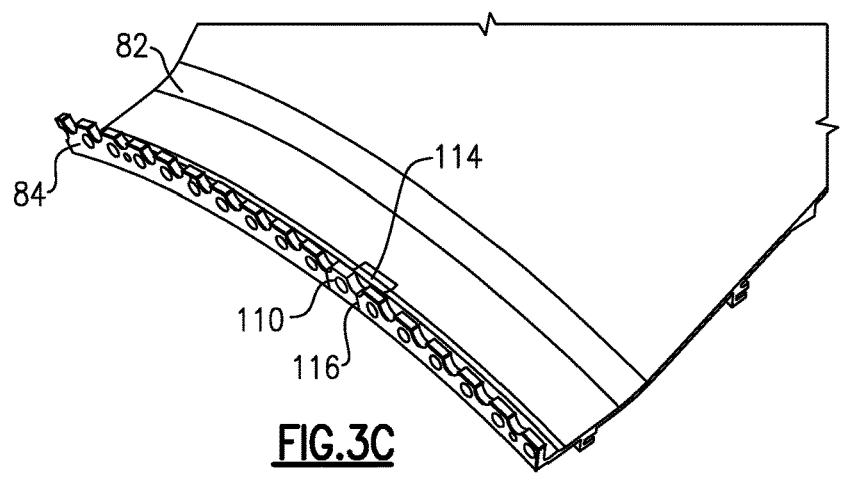
FIG. 3C shows a fully repaired casing.

As shown in FIG. 3C, the replacement part 110 has now been inserted into the prior opening 100 and 102. The replacement portion 110 is welded at 114 to the wall 82, and welded at 116 to circumferentially adjacent portions of the flange 84. While welding is described, other methods of securing the replacement portion 110 may be utilized. Now, a relatively simple method of repairing a bolt hole flange having a crack has been developed that does not require complete replacement of the bolt hole flange.

FIG. 3D shows a distinct type defect which may be repaired by the method graphically illustrated by FIGS. 3A-3C. The defect illustrated in FIG. 3D relates to a bolt hole 286 which may have been damaged or mis-drilled such that the bolt hole 286 is outside of acceptable limits, and thus requires replacement of a flange portion such as described with regard to FIGS. 3A-3C. As an example, the bolt hole 286 may have been drilled to be too large.

Types of welding processes suitable for securing the replacement portion 110 to the flange 84 include Gas Tungsten Arc, electron beam (EB), and laser or directed energy welding process in addition to others known to those of ordinary skill in the art.

The cracks 90 could also extend radially outwardly from a radially inwardly extending flange.

The replacement part 110 may not initially have a hole 112 when secured into the repair location. Rather, the replacement part may have an undersized bolt hole, or no bolt hole at all, until after the steps of FIG. 3C. The hole can then be drilled.

While the term "bolt holes" has been utilized in this application, it should be understood that other securement members may be utilized, and may extend through the holes 86. Such a hole would still meet the definition of "bolt holes" as utilized in this application.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A method of repairing a casing for a gas turbine engine, wherein the casing has a wall extending generally axially, and away from a radially extending flange, the radially extending flange being formed with a plurality of bolt holes, the method including the steps of:
   removing a portion of said flange including at least one of the plurality of bolt holes, the removed portion associated with a defect and a remaining portion of said flange including at least one non-removed bolt hole of the plurality of bolt holes;
   obtaining a replacement portion to replace the removed portion;
   securing said replacement portion in an opening left in said flange by said removed portion; and
   wherein the removed portion also includes a portion of said wall.

2. The method as set forth in claim 1, wherein the securement step is provided by welding the replacement portion into circumferential edges of the flange defining the removed portion.

3. The method as set forth in claim 2, wherein the securement step also includes the step of welding the replacement portion into a remaining portion of said wall.

4. The method as set forth in claim 1, wherein the securement step is provided by welding the replacement portion into circumferential edges of the flange defining the removed portion.

5. The method as set forth in claim 1, wherein the defect is the removed portion including a crack extending from said at least one bolt hole, and radially toward said wall.

6. The method as set forth in claim 1, wherein the defect relates to the at least one bolt hole.

7. The method as set forth in claim 1, wherein said wall is at least one of cylindrical and conical.

8. The method as set forth in claim 1, wherein said flange extends radially outwardly from the wall.

9. The method as set forth in claim 8, wherein said flange includes a radially outer portion generally circumferentially aligned with said at least one bolt hole, and scallops on circumferential sides of said outer portion, with said removed portion being removed within circumferentially spaced scallop portions.

10. The method as set forth in claim 1, wherein the replacement portion is pre-machined to a standard size, and said removed portion of said flange is removed to match the size of said pre-machined replacement portion.

11. The method as set forth in claim 1, wherein a size of said replacement portion is machined to match the size of said removed portion.

12. A repaired gas turbine engine casing comprising:
a wall extending generally axially, and having a radially extending bolt flange at one axial end, there being a plurality of bolt holes in said radially extending bolt flange; and
a portion of said at least one radially extending bolt flange having a replacement bolt hole portion secured into an opening formed by the removal of a defective bolt hole portion, and said replacement bolt hole portion including a portion of said wall.

13. The repaired gas turbine engine casing as set forth in claim 12, wherein said radially extending bolt flange extends radially outwardly from said wall.

14. The repaired gas turbine engine casing as set forth in claim 13, wherein said at least on radially extending bolt flange includes a radially outer portion generally circumferentially aligned with said at least one bolt hole, and scallops on circumferential sides of said outer portion, with said removed portion being removed within circumferentially spaced scallop portions.

15. The repaired gas turbine engine casing as set forth in claim 12, wherein a size of said replacement bolt hole portion is machined to match a size of the defective bolt hole portion.

16. A method of repairing a casing for a gas turbine engine, wherein the casing has a wall extending generally axially, and away from a radially outwardly extending flange, the radially outwardly extending flange being formed with a plurality of bolt holes, the method including the steps of:
removing a portion comprising a section of said wall and a section of said flange including at least one bolt hole, the removed portion associated with a defect, and a remaining portion of said flange including at least one non-removed bolt hole;
obtaining a replacement portion to replace the removed portion; and
welding said replacement portion into circumferential edges of the flange defining the removed portion, and also welding the replacement portion into a remaining portion of said wall.

17. The method as set forth in claim 16, wherein the replacement portion is pre-machined to a standard size, and said removed portion of said flange is removed to match the size of said pre-machined replacement portion.

18. The method as set forth in claim 16, wherein a size of said replacement portion is machined to match the size of said removed portion.

* * * * *